US 6,416,304 B1

(12) United States Patent
Tanaka et al.

(10) Patent No.: US 6,416,304 B1
(45) Date of Patent: Jul. 9, 2002

(54) MOLD FOR MOLDING TIRE

(75) Inventors: Hideaki Tanaka, Tokyo; Hirofumi Esaki, Tochigi-ken; Takehiro Kata, Tokyo, all of (JP)

(73) Assignee: Bridgestone Corporation, Tokyo (JP)

( * ) Notice: Subject to any disclaimer, the term of this patent is extended or adjusted under 35 U.S.C. 154(b) by 29 days.

(21) Appl. No.: 09/606,935

(22) Filed: Jun. 30, 2000

(30) Foreign Application Priority Data

Jul. 7, 1999 (JP) .......................................... 11-192756

(51) Int. Cl.[7] .............................................. B29C 35/02
(52) U.S. Cl. ........................ 425/28.1; 425/46; 425/812
(58) Field of Search ......................... 425/28.1, 46, 812, 425/37

(56) References Cited

U.S. PATENT DOCUMENTS

| 1,880,430 | A | * | 10/1932 | Furnas | 425/28.1 |
| 2,756,460 | A | * | 7/1956 | Heintz, Jr. | 425/28.1 |
| 4,023,268 | A | * | 5/1977 | Momchilov | 425/28.1 |
| 4,553,918 | A | * | 11/1985 | Yoda et al. | 425/46 |
| 5,204,036 | A | * | 4/1993 | MacMillan | 425/46 |
| 5,234,326 | A | * | 8/1993 | Galli et al. | 425/46 |

FOREIGN PATENT DOCUMENTS

| JP | 10-264169 | 10/1998 |
| JP | 11-034060 | 2/1999 |

* cited by examiner

*Primary Examiner*—James P. Mackey
(74) *Attorney, Agent, or Firm*—Sughrue Mion, PLLC

(57) ABSTRACT

An annular mold having a molding surface for forming a tread pattern of a tire is divided, at least in the peripheral direction, into plural pieces. The plural pieces are disposed adjacent to one another via adjacent surfaces, which are peripheral direction division surfaces, so as to form the annular mold. Substantially an entire molding-surface-side side edge portion of each adjacent surface of the piece is cut-out at a narrow width such that a gap for air venting is formed. Thus, at a low cost, a mold for molding a tire is provided in which there is no spewing, and air can always be reliably vented without a need for applying a vacuum.

15 Claims, 4 Drawing Sheets

MOLD FOR MOLDING TIRE

BACKGROUND OF THE INVENTION

1. Field of the Invention

The present invention relates to a mold for molding a tire, which mold forms a tread pattern of a tire.

2. Description of the Related Art

In a conventional mold for molding a tire, it is easy for air to be sealed between the molding surface of the mold and the unvulcanized rubber at the time of vulcanization molding. In particular, because a pattern is formed at the molding surface of the mold by projections, the projections and the unvulcanized rubber close off escape paths which allow the air to escape, and air pockets are formed. As a result, recesses (bares) are formed in the surface of the molded tire due to the air pockets, thereby deteriorating the quality of the molded product.

Generally, a method of releasing the air to the exterior of the mold by providing minute holes (vent holes, microvents) in the mold is attempted. However, processes for forming the minute holes are required.

Further, when such vent holes or slits are formed, if the opening is too large, the rubber penetrates therein such that rubber projections are formed at the surface of the tire (so-called spewing), and a separate means for eliminating this drawback must be provided. In order to avoid providing a means for eliminating this drawback, the openings must be made small enough such that spewing does not occur (i.e., cannot be made any larger than a given limit), which is inconvenient.

As another method of venting air to the exterior of a mold, Japanese Patent Application Laid-Open (JP-A) No. 10-264169 discloses providing slits for air venting in portions of adjacent surfaces, which can be easily processed, of pieces of a mold.

FIG. 8 illustrates an example of a piece 01 of a mold disclosed in JP-A-10-264169.

The piece 01 has been formed by dividing a mold by radially-extending planes which pass through a central axis of the annular mold. Various projections 05, which provide the tire with its tread pattern, are formed at a molding surface 02 of the piece 01.

Slits 06 (the hatched portions in FIG. 8) are formed in portions of an adjacent surface 03 of the piece 01 so as to pass through from the molding surface 02 to the exterior surface.

However, these slits 06 of JP-A-10-264169 are formed in portions of the adjacent surface 03 of the piece 01. Thus, in the same way as when vent holes are used, a vacuum must be applied during vulcanization. Accordingly, costs of providing and costs of maintaining devices (a device for applying the vacuum, the mold structure adapted to the vacuum application, a vulcanization device adapted to sealing processing and the like) are incurred.

In the example illustrated in FIG. 8, the slits 06 are formed so as to penetrate through from the molding surface 02 to the exterior surface, and thus occupy a large surface area. Therefore, the surface area of the surface of the piece which abuts against the adjacent piece is small, the slits are relatively weak with respect to pressure such as thermal expansion at the time of vulcanization, and it is difficult to maintain the slits 06 over time.

SUMMARY OF THE INVENTION

The present invention was developed in order to overcome the above-described drawbacks, and an object of the present invention is to provide, at a low cost, a mold for molding a tire in which air can always be vented reliably without spewing occurring and without the need for applying a vacuum.

In order to achieve this object, a first aspect of the present invention is a mold for a tire, including: (a) a plurality of mold sections each having a pair of opposite side ends, a concavely curved molding surface extending between the side ends, and a recess defined by removing at a thin width the molding-surface-side portion of the outer surface of at least one of the side ends; and (b) a holder removably supporting the mold sections in an end-to-end assembly, wherein the mold sections cooperatively define an annular space for molding a tire, with the molding surface of each mold section facing a central location of the annular space, and each side end of the mold section facing a side end of an adjacent mold section.

In accordance with the first aspect, not portions of, but substantially all of the molding-surface-side side edge portion of the adjacent surface of the piece is cut-out at a narrow width (i.e., the molding-surface-side side edge portion is cut-out substantially along the entire width thereof). If a projection is provided at the adjacent surface, the portion of the side edge portion including the projection is cut-out as well. In this way, a gap for air venting which is continuous in an elongated manner is formed between adjacent pieces. Thus, air can be vented easily, and air can be vented reliably without applying a vacuum. Further, it is easy to prevent bares from being formed.

Furthermore, in accordance with the first aspect, although it is easy to vent the air, the width of the gap for air venting is sufficiently small, and thus, spewing can be reliably prevented.

Because the gaps are formed at the adjacent surfaces of the pieces, processing is easy. As described above, there is no need for providing a means or the like for applying a vacuum, and thus the costs of providing and maintaining the mold can be kept low.

The gaps for venting air are formed by cutting-out only the molding-surface-side side edge portions of the adjacent surfaces of the pieces. Thus, the surface area of the gap takes up a small proportion of the surface area of the adjacent surface, and the remaining, majority portion of the adjacent surface can be used as an abutting surface which abuts the adjacent piece. Accordingly, even if pressure such as thermal expansion is applied when the tire is vulcanized, gaps for air venting can be stably maintained and a reduction in the gaps over time can be kept to a minimum, as compared with conventional molds.

In a second aspect of the present invention, the width of the gap for air venting is from 0.005 to 0.05 mm.

When the width of the gap for air venting is from 0.005 to 0.05 mm, spewing does not occur, and there is no need for a means for eliminating spewing. Further, because the gaps are continuous in an elongated manner, there is no need to apply a vacuum during vulcanization.

In a third aspect of the present invention, the peripheral direction width of the piece is 15 to 50 mm.

When the peripheral direction width of the piece is 15 to 50 mm, the number of gaps for air venting can be sufficiently maintained in the entire mold, and air can be vented smoothly. Further, when the peripheral direction width falls in the range of 15 to 50 mm, there is no need to provide more pieces than necessary, and thus an increase in costs can be prevented.

In a fourth aspect of the present invention, a groove, which is wider than the gap, is formed at a deeper position than the gap (i.e., at the air flow downstream side of the gap) which gap is provided, as described above, by cutting-out the molding-surface-side side edge portion of the adjacent surface of the piece at a thin width.

In accordance with the fourth aspect, the wide groove is formed further toward the back than (at the downstream side of) the gap which is formed between the pieces, such that the cross-sectional surface area of the flow path for air is enlarged. Thus, the air venting effect can be improved even more.

In a fifth aspect of the present invention, the piece is divided along projections which are provided in the molding surface to form the tread pattern.

In accordance with the fifth aspect, because the piece is divided along the projections of the molding surface, the gaps for air venting of the adjacent surfaces are formed along the projections. At the time of vulcanization, the unvulcanized rubber material is set in close contact with the molding surfaces of the pieces, and usually, lastly comes into close contact with the base portions of the projections. Thus, by forming the gaps along the projections, air can be vented smoothly.

In a sixth aspect of the present invention, a small projection is formed in the molding surface of the piece, the small projection being oriented in the peripheral direction, and having a width of 0.1 to 0.3 mm and a height of 0.1 to 0.3 mm.

At the time of vulcanization, the unvulcanized rubber material lastly comes into close contact with the base portions of the small projections. Accordingly, air is reliably moved in the peripheral direction along the small projections, and is pushed out into the gaps of the adjacent surfaces of the pieces. Thus, an excellent air venting effect can be obtained.

DESCRIPTION OF THE PREFERRED EMBODIMENT

Hereinafter, an embodiment of the present invention will be described with reference to FIGS. 1 through 6.

Figure 1:
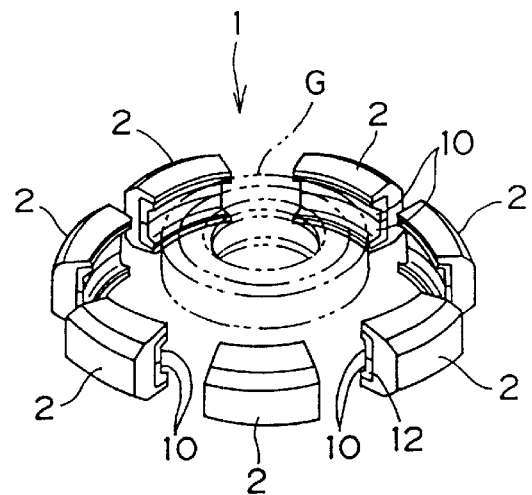
FIG. 1 is an overall schematic view of a mold for molding a tire relating to a first embodiment of the present invention.

A mold 1 for molding a tire relating to the present invention is a divided mold which is divided into plural sections in the peripheral and axial directions as illustrated in FIG. 1. More specifically, the mold 1 is divided into seven to nine (seven in FIG. 1) holders 2. Plural pieces (mold sections) 10 are provided at the inner side of each holder 2 so that the molding surface of each piece 10 faces the radially inner side. The inner sides of the pieces 10 are the molding surface of the mold which provides the tire with the tread pattern.

Each of the holders 2 holding the pieces 10 is slidable in the radial direction. The holders 2 are simultaneously slid in the centrifugal direction so as to open, and a green tire 9, which is an unvulcanized rubber material, is set in the center thereof. Next, the holders 2 are simultaneously slid toward the center and made integral so as to form the annular mold. The green tire G at the inner side is subjected to vulcanization molding.

In other words, in a state in which the plural pieces 10 have been made integral to form the annular mold, the annular mold is divided into plural portions along the peripheral direction and also into two portions in the axial direction.

Figure 2:
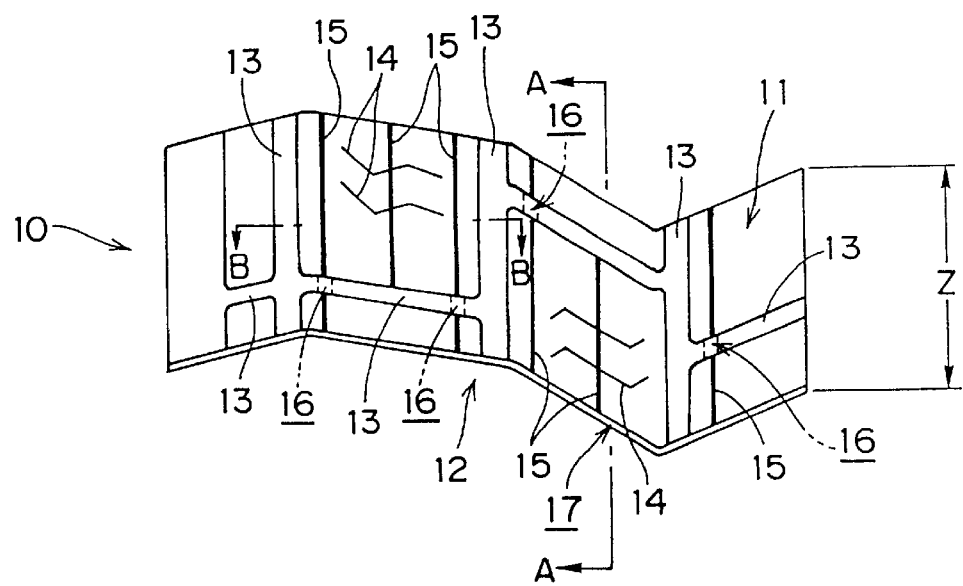
FIG. 2 is a plan view, as seen from a molding surface side, of one divisional piece of the mold.
Figure 3:
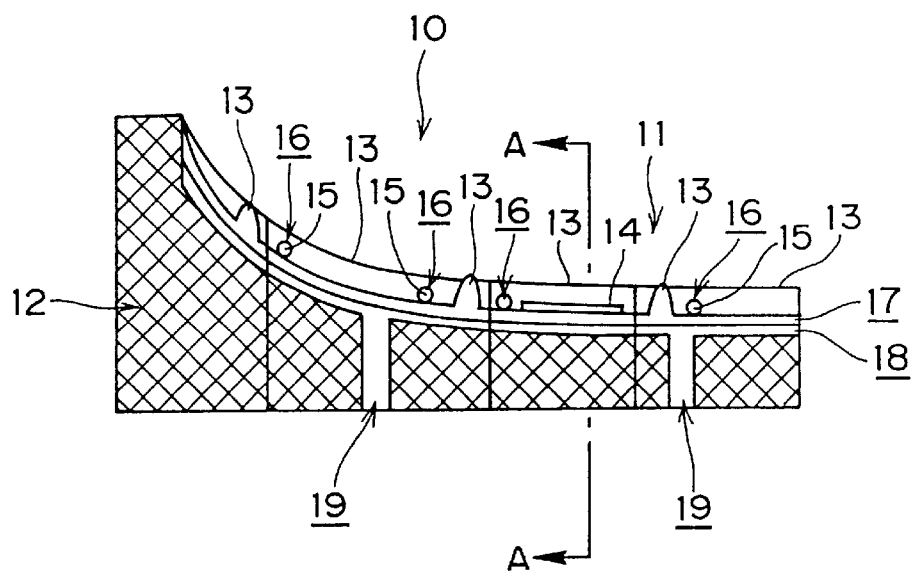
FIG. 3 is a side view, as seen from an adjacent surface side, of one divisional piece of the mold.

FIG. 2 is a view of one piece 10 as seen from a molding surface 11 side, and FIG. 3 is a view as seen from an adjacent surface 12 side.

The molding surface 11 of the piece 10 is gradually bent from the tire tread transverse direction center to just before the shoulder portion of the tire. On the other hand, the abutting adjacent surfaces 12, 12 of adjacent pieces 10, which are to face each other, are each bent in three places so as to be formed from four planes. The corresponding longitudinal surfaces of the adjacent surfaces 12, 12 are formed so as to be parallel to one another.

The longitudinal width z in the peripheral direction of the piece 10, i.e., the distance between the adjacent surfaces 12, 12, is 30 mm. It suffices for the longitudinal width z to be 15 to 50 mm.

A pattern, which is formed by projections 13 and which provides the tire with the tread pattern, is formed in the bent molding surface 11. Blades 14, which are thin metal plates and form plural slits (sipes) in the tread surface, are embedded in the molding surface 11.

Vent ridges 15, which are small projections directed in the peripheral direction, are formed in the molding surface 11. Cross vents 16, which are each formed by a small hole which passes through in the peripheral direction, are formed at required places of the projections 13 which are directed in the axial direction.

In the present embodiment, the cross vents 16 are mainly formed at the portions where the projections 13 intersect the vent ridges 15.

Figure 4:
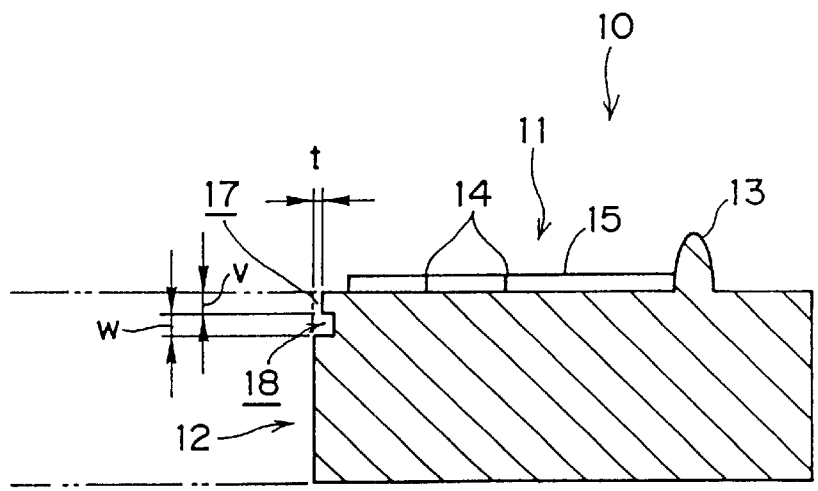
FIG. 4 is a cross-sectional view taken along line A—A of FIGS. 2 and 3.

Substantially the entire molding surface 11 side side edge portion of one of the adjacent surfaces 12 (hereinafter, this side edge portion will be referred to as the "molding-surface-side side edge portion"), including the projections 13 thereat, is cut-out by a narrow width such that, as illustrated in FIG. 4, this cut portion (recess) forms a gap 17 between that piece 10 and the adjacent piece 10. The width t of the gap 17 is 0.03 mm, and the depth v thereof is 2 mm.

If the width t is in the range of 0.005 to 0.05 mm, spewing can be prevented, and there is no need to provide a means for eliminating spewing. It suffices for the depth v of the gap 17 to be in the range of 1 to 2 mm.

A groove 18, which is wider than the width t of the gap 17, is formed in the adjacent surface, at a position deeper (further back) than the gap 17 (i.e., at the air flow downstream side of the gap 17).

The groove 18, having a width of w, extends below the gap 17. The width w is 2 mm, although any width in the range of 1 to 3 mm suffices.

Namely, the wide grooves 18 are formed below (at the downstream side of) the gap 17 formed in the pieces 10, 10, such that the cross-sectional surface area of the flow path of air is enlarged.

A path 19 communicates the groove 18 and the exterior surface of the piece 10. The cross-sectional surface area of the flow path of air of the path 19 is greater than that of the gap 17.

Thus, in the present embodiment, even if the width t of the gap 17 is made small such as 0.005 mm (if the width t of the gap 17 is 0.005 mm, the desired air venting effect can still be achieved), because the cross-sectional surface areas of the flow paths of the downstream side groove 18 and path 19 are greater than that of the gap 17, a good air venting effect can be obtained despite the fact that the width t of the gap 17 is small.

As illustrated in FIG. 3, the portion of the adjacent surface 12 other than the gap 17, the groove 18 and the paths 19, which portion is the majority of the adjacent surface 12, (i.e., the portion illustrated by the lattice-like pattern in FIG. 3) is the surface which directly abuts the adjacent piece 10. Namely, the adjacent surfaces 12 directly abut one another over a sufficiently wide surface area. Thus, even if pressure such as thermal expansion is applied at the time the tire is vulcanized, the gap 17 for air venting can be reliably maintained, and thus, a decrease over time of the width t of the gap 17 can be kept to a minimum.

As described above, the adjacent surfaces 12, 12 of the pieces 10 are four planes which are bent so as to follow, as much as possible, the projections 13 formed at the molding surface 11.

The adjacent surfaces 12, 12 are formed substantially parallel to, in particular, the projections 13 which are directed in the axial direction.

Because the gaps 17 for air venting are formed in the adjacent surfaces 12, 12 severing the projections 13, the gaps 17 extend along the projections 13.

During vulcanization, the green tire G which is an unvulcanized rubber material is set in close contact with the molding surface 11 of the piece 10. Usually, the portions of the molding surface 11 that the green tire G contacts last are the base portions of the projections 13. Thus, by forming the gaps 17 along the projections 13, air, which collects easily at the base portions of the projections 13, can be vented smoothly.

Figure 6:
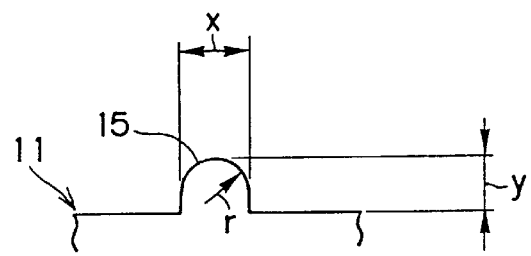
FIG. 6 is a cross-sectional view of a vent ridge.

Further, the vent ridges 15, which are small projections directed in the peripheral direction, are formed in the molding surface 11 of the piece 10. As illustrated in FIG. 6, the cross-sectional configuration of the small-rib-shaped vent ridge 15 is a substantially semicircular configuration whose width x is 0.2 mm, height y is 0.2 mm, and radius r is 0.1 mm.

If the width x is from 0.05 to 0.5 mm, the height y is from 0.05 to 0.5 mm, and the radius r is from 0.025 to 0.3 mm, no groove which deteriorate the external appearance of the vulcanization-molded tread are formed, and there are no problems with respect to the processing efficiency.

Figure 5:
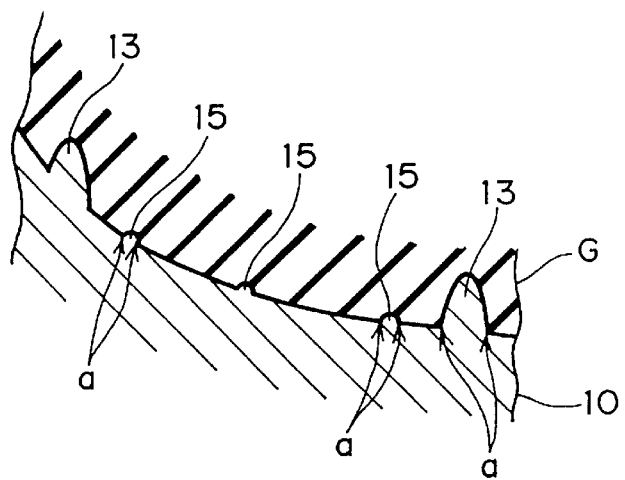
FIG. 5 is a view illustrating a cross-section of a piece which has been cut along line B—B in FIG. 2 and a cross-section of a green tire G which has been set in close contact with the piece.

FIG. 5 is a cross-sectional view illustrating a state in which the green tire G is set in close contact with the molding surface at the time of vulcanization. As illustrated in FIG. 5, at the projections 13, air is lastly forced against the base portions of the vent ridges 15 which are small projections (even if the vent ridges 15 are small).

Because the vent ridges 15 are directed in the peripheral direction, the air a which has been forced thereagainst is, due to the further pressing of the green tire G against the molding surface, made to move in the same peripheral direction along the vent ridges 15 and is pushed out into the gaps 17 in the adjacent surfaces of the pieces. Accordingly, it is difficult for air pockets to form, and the formation of bares can be reliably prevented.

The cross vents 16 are formed at the projections 13 which project out at the molding surface 11, and in particular, at the projection 13 which are directed in the peripheral direction. Thus, the air which is sealed in between the projections 13, 13 escapes in the peripheral direction via the cross vents 16 and can be vented from the gaps 17.

In particular, the cross vents 16 are formed at the portions at which the projections 13 intersect the vent ridges 15. Thus, when the air a which has been forced against the base portions of the vent ridges 15 moves in the peripheral direction along the vent ridges 15 as described above, the air can smoothly pass through the projections 13 via the cross vents 16 in the direction of movement.

Figure 7:
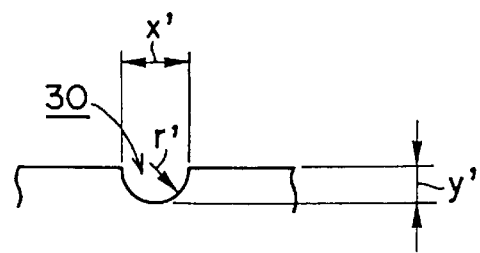
FIG. 7 is a cross-sectional view of a small groove which is used in place of the vent ridge.
Figure 8:
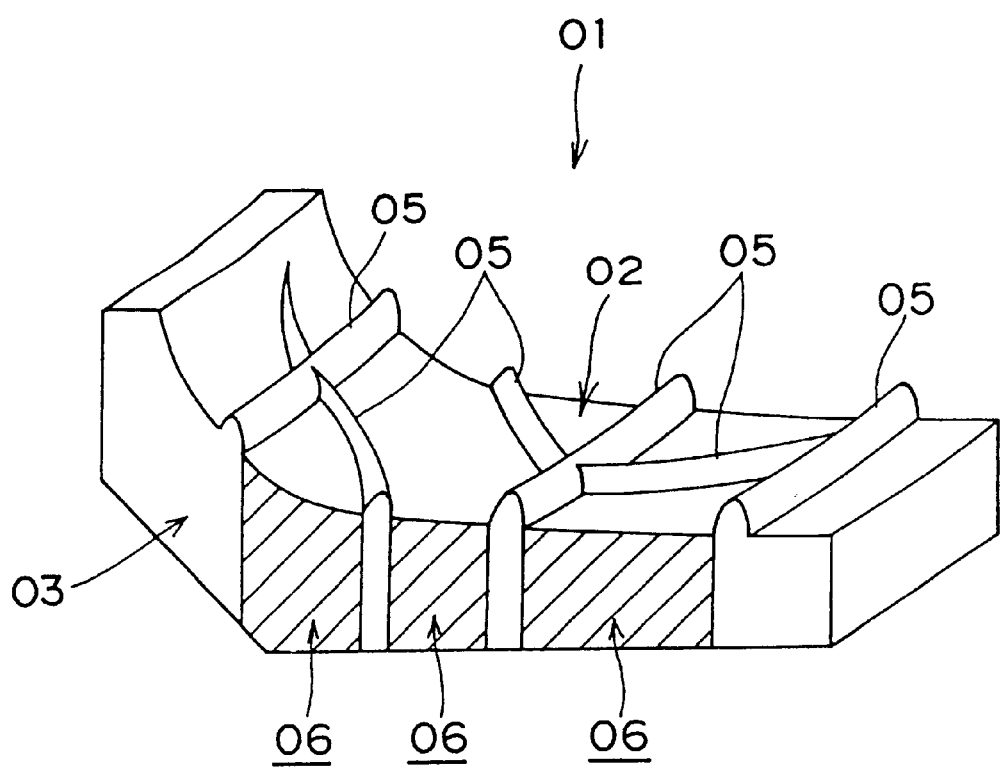
FIG. 8 is a perspective view illustrating a piece of a conventional mold.

Instead of the vent ridges 15, small grooves 30 such as those illustrated in FIG. 7 may be provided.

If the small grooves 30 have a width x' of 0.02 to 0.3 mm, a depth y' of 0.1 to 0.3 mm, and a radius r' of 0.05 to 0.15 mm, during vulcanization, air is reliably moved in the peripheral direction, and projections which deteriorate the external appearance of the vulcanization-molded tire are not formed.

The longitudinal width z in the peripheral direction of the piece 10 is 30 mm. Accordingly, when the respective pieces 10 are made integral, the gap 17 for air venting, whose width t is 0.03 mm, exists each 30 mm along the peripheral direction. Each gap 17 is formed so as to be continuous along the entire molding surface 11 side side edge portion of the adjacent surface 12. Thus, in the present embodiment, a sufficient cross-sectional surface area of an air flow path can be ensured in the entire molding surface 11 and an excellent air venting effect can be achieved, without applying a vacuum.

Because the gaps 17 are formed in the adjacent surfaces of the pieces, processing for forming the gaps 17 is easy, and there is no need for a means for applying a vacuum. Therefore, the original costs and maintenance costs can be kept low.

The longitudinal width z in the peripheral direction of the piece 10 is of course not limited to the 30 mm described above. If the longitudinal width z in the peripheral direction is in the range of 15 to 50 mm, a sufficient number of gaps for air venting can be pro in the entire mold, and air venting can be carried out smoothly. Further, if z is in the range of 15 to 50 mm, there is no need to increase the number of pieces beyond the necessary number, and thus, an increase in costs due to an increased number of pieces can be avoided.

What is claimed is:

1. A mold for a tire, comprising:
    (a) a plurality of mold sections each having a pair of opposite side ends, a concavely curved molding surface extending between the opposite side ends, and a recess defined by removing at a given width a molding-surface-side portion of an outer surface of at least one of the side ends such that said recess extends continuously along and is continuously open to the molding surface; and
    (b) a groove formed in the side end of a mold section and is adjacent to the recess, the groove being deeper than the recess and has a side that is at least partially continuous with the recess.

wherein the mold sections cooperatively define an annular space for molding a tire, with the molding surface of each mold section facing a central location of the annular space, and each side end of the mold section facing a side end of an adjacent mold section.

2. The mold of claim 1, wherein when the mold sections cooperatively define the annular space, there is a total gap of from 0.005 to 0.05 mm between adjacent mold sections.

3. The mold of claim 1, wherein the molding surface of a mold section has a length from one side end to the other side end of that section, ranging from 15 to 50 mm.

4. The mold of claim 1, wherein said groove extends continuously along the molding surface and is deeper than said recess, said groove having a width in the range of 1 to 3 mm.

5. The mold of claim 1, further comprising a path of fluid communication extending from each groove to an exterior of the mold section.

6. The mold of claim 5, wherein the path has a cross-sectional area for fluid communication is greater than a cross-sectional area of the recess when adjacent side ends are tightly faced.

7. The mold of claim 1, wherein a projection for forming part of a tread pattern in a tire extends from the molding surface of each mold section, and each side end is formed along the projection.

8. The mold of claim 1, wherein a vent ridge extends from the molding surface of each mold section, and extends in a circumferential direction relative to the annular space, having a width of 0.1 to 0.3 mm and a height of 0.1 to 0.3 mm.

9. The mold of claim 8, wherein a projection for forming part of a tread pattern in a tire extends from the molding surface of each mold section and intersects the vent ridge of that section, and having a hole defined in a portion of the projection intersecting the vent ridge.

10. The mold of claim 1, wherein the molding surface of each mold section has a shallow groove defined therein, extending circumferentially relative to the annular space, the groove having a width from 0.02 to 0.3 mm and a depth from 0.1 to 0.3 mm.

11. The mold of claim 10, wherein a projection for forming part of a tread pattern in a tire extends from the molding surface of each mold section and intersects the shallow groove of that section, and having a hole defined in a portion of the projection at the intersection.

12. The mold of claim 9, wherein the vent ridge is provided such that fluid communication along the vent ridge is secured, via said hole, between the side ends when the mold sections are arranged in said end-to-end assembly.

13. The mold of claim 11, wherein the groove is provided such that fluid communication along the groove is secured, via said hole, between the side ends when the mold sections are arranged in said end-to-end assembly.

14. A mold for a tire, comprising:
(a) a plurality of mold sections each having a pair of opposite side ends, a concavely curved molding surface extending between the opposite side ends, and a channel formed in an outer surface of at least one of the side ends, the channel having a bottom and opposing walls extending from the bottom of the channel thereby defining a channel interior, one wall being shorter than the other and having a width extending said molding surface to the interior of the channel; and
(b) a holder removably supporting the mold sections in an end-to-end assembly,
wherein the mold sections cooperatively define an annular space for molding a tire , with the molding surface of each mold section facing a central location of the annular space, and each end of the section facing a side end of an adjacent mold section.

15. The mold of claim 14, wherein when the mold sections cooperatively define the annular space, there is a total gap of from 0.005 to 0.05 mm between adjacent mold sections.

* * * * *